July 11, 1939.  A. WEISS ET AL  2,165,320

MEANS FOR CONTROLLING THE OPERATION OF MOTOR VEHICLES OR THE LIKE

Filed May 18, 1937    2 Sheets-Sheet 1

INVENTOR
ABRAHAM WEISS.
and Joseph WEISS
BY
ATTORNEY

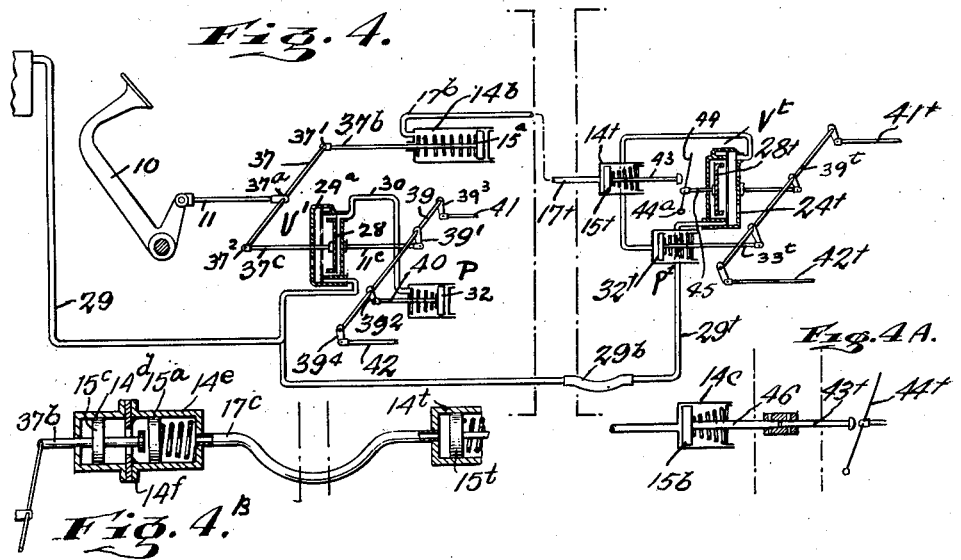

Patented July 11, 1939

2,165,320

UNITED STATES PATENT OFFICE 2,165,320

MEANS FOR CONTROLLING THE OPERATION OF MOTOR VEHICLES OR THE LIKE

Abraham Weiss and Joseph Weiss, New York, N. Y.

Application May 18, 1937, Serial No. 143,282

3 Claims. (Cl. 188—3)

This application is a continuation in part of the pending application Ser. No. 130,474 filed March 12, 1937, and the invention relates to means for operating motor vehicles or the like.

One of the objects of this invention is to provide means whereby the operation of mechanisms may be controlled from a distance by fluid pressure means operable by hand or foot.

A further object of this invention is to provide such means whereby the operation of different mechanisms of a motor vehicle such as accelerator and brakes may be controlled from the distance by fluid pressure means operable by hand or foot.

A further object of this invention is to provide means whereby the operation of accelerator and brakes of a motor vehicle may be controlled from a single point opposite the driver's seat by fluid pressure operable by foot or hand.

Still another object of my invention is to provide a means whereby the operation of brakes in a motor tractor and trailer may be controlled from a single point in the motor vehicle by fluid pressure means operable by foot or hand.

And still another object is to provide means whereby the application of the brakes of both the motor vehicle and the trailer will be synchronized and the braking force equalized.

With these and other objects in view our invention consists in the novel construction, combination, and arrangement of parts as will be hereinafter more fully described and defined in the appended claims.

In the accompanying drawings which constitute part of this specification, and in which similar reference characters denote corresponding parts:

Figure 1 is a diagrammatic view of a brake pedal of a mechanically operable brake mechanism combined with a fluid pressure means for controlling the operation of an accelerator or the like;

Figure 4 is a diagrammatic view of a similar means shown in Figure 3 combined with means for synchronizing the operation of brakes in both trailer and tractor and equalizing the braking force;

Figure 4a and 4b are fragmentary diagrammatic views of modified details of construction.

Figure 1:
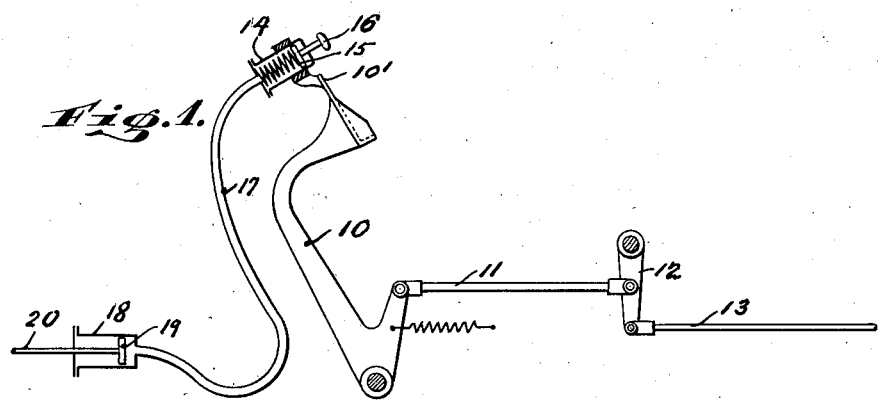

In Figure 1 the combination of a fluid pressure control means with a brake pedal for operating an ordinary mechanical brake mechanism is shown. Here 10 denotes the brake pedal for a mechanical brake mechanism of a motor vehicle, represented by rod 11 connected to lever 12 which through rod 13 operates the mechanical brakes (not shown). The foot rest 10' of the brake pedal 10 carries a fluid container, such as cylinder 14, in which is provided a piston 15 or the like formed with a knob 16 operable by the driver's foot bearing on the rest 10' of the brake pedal 10. The cylinder 14 communicates by hose 17 with another fluid cylinder 18 in which works a piston 19 whose piston rod 20 forms part of the accelerator or the like. The fluid cylinders 14 and 18 and pistons 15 and 19 with the hose 17 communicating therewith constitute a fluid pressure device whereby the driver is able by rocking his foot bearing on the brake pedal to control the operation of the accelerator and operate the mechanical braking mechanism. By employing fluid pressure means, in lieu of the mechanical means including an auxiliary pedal connected to the brake pedal, as shown in said pending application, instantaneous action is afforded without any lost motion, the construction is greatly simplified, and the operation of the brakes and accelerator or the like is facilitated.

Figure 2:
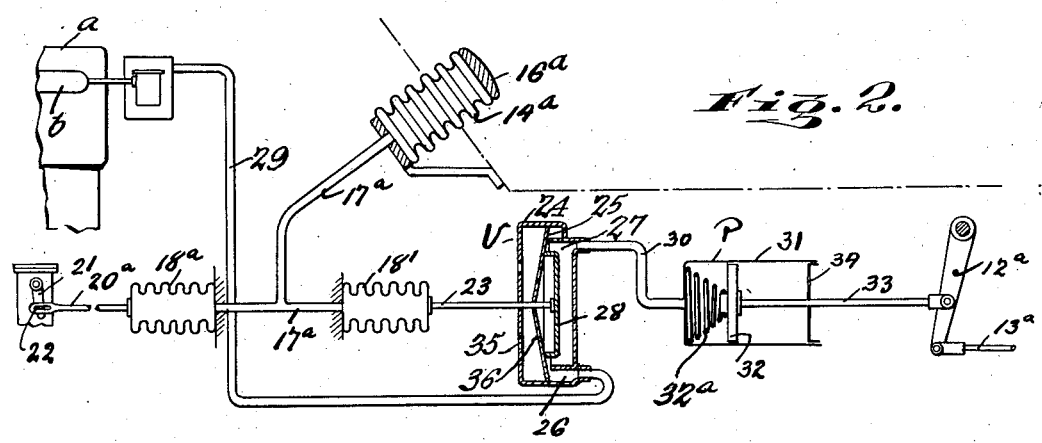
Figure 2 is a diagrammatic view of a power unit operated braking mechanism combined with fluid pressure means for controlling the operation of an accelerator or the like and of the power unit of the braking mechanism.

In Figure 2 the brake mechanism is of the automatic type, i. e. in which the brakes are operated through the action of a power unit.

Here the brake pedal 10 is eliminated and the brake mechanism (not shown) is adapted to be operated through the lever 12a and rod 13a from a vacuum power unit controlled by means of a suitable control valve which may be of the well-known construction used in connection with power brakes. The operation of the control valve, as well as that of the accelerator or the like is here affected by fluid pressure means similar to those described in connection with Figure 1.

More specifically, the device used is as follows:

Near the floor of the driver's cabin a master fluid pressure means is provided, which may comprise a fluid container and piston similar to that shown in Figure 1 or a fluid container of the compressible type, 14a. This compressible fluid container at one end is fixed to a stationary part of the floor and manipulable by means of a push member or diaphragm 16a provided on top thereof. The stationary end of said fluid container 14a communicates through a hose 17a with a similar fluid containing member 18a of the compressible type fixed at one end and connected at its other end through rod 20a to the accelerator or other vehicle control mechanism by lever 21. In case of an accelerator, the rod 20a engages the lever 21 with play, as at 22, so that the accelerator may be actuated immediately upon the release of the brakes.

A branch of the hose 17ª leads into another similar compressible fluid container 18' fixed at one end and at the other end connected through rod 23 with the power unit control valve V of well-known construction. This valve as usual comprises a housing 24 partitioned by a flexible diaphragm 25 controlling vacuum passages 26 and 27 by means of a plunger 28 connected to the rod 23. The valve V is interposed between the intake manifold $b$ of the motor $a$ of the vehicle which manifold is connected to the passage 26 of said control valve V through a hose 29. Leading from the other passage 27 of said valve V is a hose 30 terminating in the rear end of the housing 31 of a power unit P. The power unit P is also of known construction, comprising as usual a spring actuated piston 32 working in the housing 31 and which by rod 33 is connected to the brake operating lever 12ª which through rod 13ª operates the brake mechanism (not shown). The cylinder 31 is provided in its front end with an air hole 34 and air holes 35, 36 are provided in the housing 24 of the control valve V and in the diaphragm 25 respectively.

Assuming that with this construction the brakes are normally held in applied position through means similar to those of the construction described in our pending application Serial No. 130,474, and that the power unit P is employed for the release of the brakes, our device operates as follows:

When the vehicle is to be started, the driver presses on the diaphragm 16ª of the fluid pressure member 14ª which instantaneously transmits the fluid pressure to the members 18ª and 18' through the branched hose 17ª. In the position shown the piston 32 of the power unit P is retracted due to the vacuum at the rear of the piston admitted from the intake manifold $b$, hose 29, passages 26, 27 and hose 30, while there is atmospheric pressure in front of the piston admitted through the air hole 34. Upon the depression of the diaphragm 16ª fluid pressure actuating the members 18ª and 18' through the hose 29 will have the following effect:

The rod 23 operated from fluid pressure member 18' will move the plunger 28 away from the diaphragm 25, releasing the latter, so that it will flex back into normal position, cutting off communication between passages 26 and 27 of the control valve V, and admitting atmospheric pressure into the cylinder 31 of the power unit P through openings 35, 36 and passage 30 as a result thereof and by the aid of the spring 32ª, the piston 32 of the power unit P will move forwardly, thereby actuating lever 12ª which in its turn through rod 13ª actuates the brake releasing means (not shown).

Simultaneously with the operation of the fluid pressure means 18', the fluid pressure member 18ª will be operated to move the rod 20ª to bear with the right end of its slot against the pin of the lever 21. Upon a continued pressure on the master member 16ª, and the consequent movement of the rod 20ª further to the left, the arm 21 will be turned to actuate the throttle valve or accelerator in well known manner.

Thus through a single operation of the master fluid pressure means 16ª both brakes and accelerator or the like will be automatically controlled.

Figure 3:
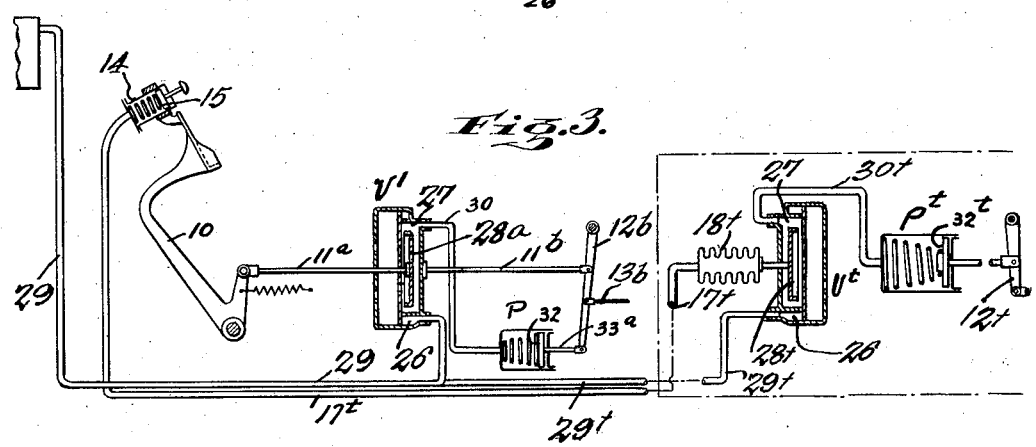
Figure 3 is a diagrammatic view of power unit operated braking mechanisms for tractor and trailer combined with fluid pressure means for controlling the power units of both tractor and trailer.

When a trailer is coupled to a motor vehicle, the same principle of utilizing fluid pressure means may be applied for the control of the brake operating means in both, tractor and trailer, from a single point in the tractor. Such structure is illustrated in Figure 3.

Here interposed between the power unit P and the fluid pressure means 14, 15 carried by the brake pedal 10 is a control valve V' which may be of the same construction as valve V except that its housing is suspended to be floating or movable axially in the path of its plunger 28ª.

The brake pedal 10 is connected to the plunger 28ª of the power unit control valve V' by rod 11ª and the plunger 28ª is connected to the lever 12ᵇ by rod 11ᵇ. Connected to this lever 12ᵇ is also the rod 33ª of the piston 32 of the power unit P. Rod 13ᵇ is adapted to operate the brake mechanism (not shown) in the usual manner.

The trailer is provided with a power unit Pᵗ whose piston 32ᵗ is connected to lever 12ᵗ from which the brake actuating mechanism (not shown) of the trailer is operated. It also has a power control valve Vᵗ which may be similar to valve V in the construction shown in Figure 2 whose plunger 28ᵗ is operatively connected to the movable end of the fluid pressure member 18ᵗ, and into the stationary end of which terminates the tube or hose 17ᵗ leading from the master fluid pressure member 14, 15, supported on the brake pedal 10.

The control valve V' and Vᵗ are supplied with vacuum from the intake manifold through branch hoses 29 and 29ᵗ and the power units P, Pᵗ through branch hoses 30, 30ᵗ.

It will be clear that on the depression of the brake pedal 10 in the tractor part of the motor vehicle, the plunger 28ª in control valve V' will flex the diaphragm thereof opening communication between passages 26 and 27 thereof, so that vacuum will be admitted to the power unit P as a result of which the piston 32 thereof will actuate the lever 12ᵇ to operate the brakes of the tractor. By pressing on the piston 15 of the master fluid pressure means 14, 15 supported on the brake pedal 10, the fluid pressure means 18ᵗ in the trailer will be actuated moving the plunger 28ᵗ in the control valve Vᵗ to open communication between passages 26 and 27 thereof and to send vacuum from the intake manifold of the motor into the power unit Pᵗ of the trailer and thereby actuate the brakes (not shown) of the latter.

Due to the use of the floating type of control valve V' the braking action of the brakes in the tractor will have the tendency to automatically adjust itself to prevent overbraking, in well-known manner.

In Figure 4 a modified structure of brake control means for tractor and trailer is shown.

Here the brake pedal 10 is pivotally connected to an intermediate point 37ª of a cross bar 37 one end 37' of which by rod 37ᵇ is pivotally connected to the plunger 15ª of a fluid pressure container 14ᵇ and the other 37² by rod 37ᶜ to the plunger 28 of the vacuum control valve V', whose vacuum passages, as in the previously described constructions communicate with the intake manifold and power unit P through hoses 29 and 30 respectively. The housing 24ª of said control valve V' which is of the floating or movable type is connected by rod 11ᶜ and crank arm 39' to a cross rod 39. This cross rod is also connected by crank arm 39² to the rod 40 of the piston 32 of the power unit P, while its ends are connected by crank arms 39³, 39⁴ to the rods 41 and 42 respectively operating the brake mechanisms (not shown) of the tractor motor vehicle.

The trailer is also provided with a fluid pressure cylinder or container 14$^t$ which through tube or hose sections 17$^b$ and 17$^t$ to be suitably coupled communicates with the fluid cylinder 14$^b$ and whose piston or plunger 15$^t$ has a rod 43 which is adapted when moved forwardly with its piston 15$^t$ to abut against and operate a lever 44 fulcrumed at 44$^a$ in the trailer. This lever 44 is operatively connected to the rod 45 of the piston or plunger 28$^t$ of the vacuum control valve V$^t$ of the trailer, whose housing 24$^t$ is movable and connected to the crank arm of the cross rod 39$^t$. The piston or plunger 32$^t$ of the power unit P$^t$ is also connected by rod 33$^t$ to a crank arm on said cross rod 39$^t$, the ends of which as in the tractor are connected to cranks on rods 41$^t$, 42$^t$ of the brake operating mechanism (not shown).

The vacuum supply hose 29 is coupled, as at 29$^b$, to the hose 29$^t$ leading into one of the passages of the control valve for the control of the power unit P$^t$, as before.

The above described device operates as follows:

On the depression of brake pedal 10 the rod 11 will pull on the cross bar 37, thereby moving through rod 37$^b$ the plunger 15$^a$ to compress the fluid and operate thereby the plunger 15$t$ of the fluid pressure means in the trailer and, at the same time by the rod 37$^c$ the plunger of the valve V' of the tractor. As a result thereof the rod 43 will operate the lever 44 which will move the plunger 28$^t$ of the control valve V$^t$ of the trailer to operate the power unit P$^t$ and thereby the brakes in the trailer, while through the operation of plunger 28 in valve V' the power unit P will actuate through plunger 32 the brakes in the tractor.

If owing to some idle motions, or play in the working parts of the brake mechanism, the brakes in the tractor and trailer will not be applied simultaneously, there will be an automatic adjustment in the following manner:

Assuming that the brakes in the tractor are applied before those of the trailer. In that event the further depression of the brake pedal will have no effect on the power unit P of the tractor, no further movement of the plunger 28 of the control valve V' being produced, while the plunger 15$^a$ of the fluid pressure means 14$^b$, 15$^a$ will still continue to move forwardly forcing the fluid into the fluid cylinder 14$^t$ of the trailer. This will be possible, as the bar 37 will be permitted to swing on its pivot 37$^2$ as a fulcrum instead of being pulled bodily forward. In this manner the action of the brakes in both tractor and trailer will automatically become more or less synchronized and the forces thereof equalized.

In the structure shown in Figure 4 the fluid supply tube or hose is sectional, the two sections being adapted to be coupled together. But with such arrangement the coupling requires special packing and in case of a leak, the brake system may fail. To avoid this, we provide a modification shown in Figure 4a. Here the fluid cylinder 14$^c$ of the trailer has been transferred to the tractor and its piston or plunger 15$^b$ is provided with a rod 46 which is adapted to be coupled by a suitable coupling to the rod 43$^t$ projecting from the trailer and which, as before, actuates the lever 44$^t$ connected to the plunger or piston of the control valve V$^t$.

Another modification of a coupling arrangement is shown in Figure 4b.

Here in lieu of the cylinder 14$^c$, we employ a double cylinder 14$^d$, 14$^e$ having suitable coupling means, as at 14$^f$. A hose 17$^c$ connects both said cylinders, and working therein is a double interconnected piston or plunger 15$^c$, 15$^d$. The cylinder 14$^e$ communicates through hose 17$^c$ with a fluid pressure cylinder 14$^t$ in the trailer and the piston 15$^t$ actuates the lever 44 as in the construction shown in Figure 4.

It will be seen that with either of the constructions shown in Figure 4a and 4b the fluid pressure means of tractor and trailer can be easily and conveniently coupled, without any danger of spilling any fluid.

It is understood that our invention is not to be limited to the details of constructions described and shown, since various modifications may be made without departing from the spirit of an invention.

What we claim is:—

1. In a motor vehicle serving as tractor and having a trailer coupled thereto, brake control means in each, tractor and trailer, means for simultaneously operating both said brake control means, said operating means including a manually operable member operatively connected to said tractor brake control means, a fluid compressor associated with said member, a fluid pressure transmitting means in said trailer directly and simultaneously responsive to the action of said compressor and operatively connected to said trailer brake control means and means associated with said manually operable member and capable of actuating said compressor without actuating to said tractor power unit so as to equalize the braking action in both tractor and trailer.

2. In a motor vehicle serving as tractor and having a trailer coupled thereto, brake control means in each, tractor and trailer, each of said means including a valve controlled power unit therefor, means for the simultaneous operation of both said brake control means, said operating means including a foot operable member operatively connected to said valve of the tractor brake control means, a fluid compressor associated with said member, a fluid pressure transmitting means in said trailer directly and simultaneously responsive to the action of said compressor and operatively connected to the valve of said trailer brake control means and means associated with said manually operable member and capable of actuating said compressor without actuating to said tractor power unit so as to esualize the braking action in both tractor and trailer.

3. In a motor vehicle serving as tractor and having a trailer coupled thereto, brake control means in each, tractor and trailer, each of said means including a valve controlled power unit and a fluid compressor, pressure transmitting means between said two compressors, means capable of actuating said trailer valve controlled power unit simultaneously with the operation of said tractor compressor, a manually operable means for actuating said tractor power unit, said means including an element capable of actuating the tractor compressor without actuating the tractor power unit to automatically equalize the braking action in both tractor and trailer.

ABRAHAM WEISS.
JOSEPH WEISS.